United States Patent [19]

Settineri

[11] Patent Number: 4,756,337
[45] Date of Patent: Jul. 12, 1988

[54] GASLINE REPAIR KIT

[75] Inventor: Robert A. Settineri, Gibsonia, Pa.

[73] Assignee: Royston Laboratories, Inc., Pittsburgh, Pa.

[21] Appl. No.: 9,673

[22] Filed: Feb. 2, 1987

Related U.S. Application Data

[63] Continuation-in-part of Ser. No. 832,072, Feb. 24, 1986, Pat. No. 4,681,986.

[51] Int. Cl.⁴ .............................................. F16L 55/18
[52] U.S. Cl. ................................. 138/99; 174/84 R; 156/49; 156/53
[58] Field of Search ...................... 138/97–99, 138/DIG. 1, 144, 145; 206/582, 223, 225; 285/15, 16; 156/94, 48, 49, 53–56, 187, 188, 195; 174/84 R, 23 R, 22 R; 428/99, 97; 264/36; 428/519

[56] References Cited

U.S. PATENT DOCUMENTS

| | | | |
|---|---|---|---|
| 3,235,289 | 2/1966 | Jones | 156/49 |
| 3,370,998 | 2/1968 | Wiswell, Jr. | 156/94 |
| 3,691,505 | 9/1972 | Graves | 174/84 R |
| 3,770,556 | 11/1973 | Evans et al. | 138/99 |
| 3,876,454 | 4/1975 | Snell et al. | 174/84 R |
| 4,014,370 | 3/1977 | McNulty | 138/145 |
| 4,287,034 | 9/1981 | Pieslak et al. | 138/DIG. 1 |
| 4,357,961 | 11/1982 | Chick | 138/97 |
| 4,424,246 | 1/1984 | Pieslak et al. | 138/99 |
| 4,472,231 | 9/1984 | Jenkins | 138/DIG. 1 |
| 4,517,234 | 5/1985 | Fisher | 138/99 |
| 4,585,091 | 4/1986 | Budd | 138/99 |

FOREIGN PATENT DOCUMENTS

| | | | |
|---|---|---|---|
| 752289 | 2/1967 | Canada | 156/49 |
| 0141889 | 5/1970 | Fed. Rep. of Germany | 156/49 |
| 0110894 | 7/1982 | Japan | 264/36 |
| 2140529 | 11/1984 | United Kingdom | 138/97 |

Primary Examiner—Henry J. Recla
Assistant Examiner—L. J. Peters
Attorney, Agent, or Firm—Andrew F. Kehoe

[57] ABSTRACT

A kit comprising materials for sealing leaks in low-pressure gas lines. The kit contains, (a) optionally, a container of corrosion-resistant primer composition; and (b) a special laminated tape comprising a ply of rubber such as neoprene and a ply of pressure-sensitive conformable polyer-based adhesive material based on, e.g., ethylene-propylene rubber, and (c) a seal restraining fabric impregnated with a curable resin such as moisture-curable polyurethane which is characterized by good shelf life and a controlled curing speed when subjected to moisture. The tape of the invention also relates to the novel protective patch structures which are formed by use of the kit material.

12 Claims, 1 Drawing Sheet

GASLINE REPAIR KIT

RELATED APPLICATION

This invention is a continuation-in-part of U.S. patent application Ser. No. 832,072 filed on 24 Feb. 1986 by Robert A. Settineri and entitled SPLICE CONSTRUCTION FOR ELECTRICAL CABLE AND METHOD FOR MAKING SAME (as amended 22 Sept. 1986), now U.S. Pat No. 4,681,986.

BACKGROUND OF THE INVENTION

This invention relates to a process, and kit means, for repairing pipes, particularly low-pressure gas lines. "Low-pressure gas" as used herein relates to gas under a pressure of up to 16 ounces per square inch of gas pressure.

There is a substantial amount of gas pipeline which is used in low-pressure service. Much of this, because it is buried in soil or for some other environmental reason, is subjected to corrosive action with the result that it is often necessary to repair such pipelines. Various repair systems for pipelines are disclosed in U.S. Pat. Nos. 2,924,548; 4,465,309; 3,563,276; 4,448,218 and 3,358,898. Some, such as Pat. No. 2,924,546, disclose use of resin systems which are impregnated and cured at the repair site to form a shield for the repair construction. U.S. Pat. No. 4,357,951, discloses such a system in combination with a felt-type sheet backed with a very thin film (1–2 mils) of polyurethane.

Despite the attention given by prior workers to the problem of sealing gas leaks, there has remained a need for a convenient system capable of assuring long-lasting repairs and capable of being used to heal low-pressure gas leaks in conduits of a wide variety of diameters.

SUMMARY OF THE INVENTION

It is a principal object of the invention to provide a quick and dependable means to provide a longterm, even permanent, repair to a low-pressure gas line.

It is another object of the invention to provide a process whereby a corroded pipeline may be repaired and stabilized against corrosion.

Another object of the invention is to provide a process whereby a repair-patch structure or a pipeline is shielded against subsequent mechanical abuse.

It is another object of the invention to provide means to repair pipelines of various diameters.

Another object of the invention is to provide kit means to enable the use of the invention in the field.

Other objects of the invention will be obvious to those skilled in the art upon their reading of this disclosure.

The above objects have been achieved by the development and construction of a leak-sealing structure of the type wherein holes in a steel pipe are plugged with a patching material, the improvement wherein said patching material is formed of: (a) a sheet of a sealing tape comprising (1) a first one ply of a conformable, tacky pressure-sensitive composition and (2) a second ply of a tough, extensible backing polymer; (b) a hermetically-sealed container containing a restraining fabric impregnated with a resin which is curable, by contact with moisture, into a hard, moisture-resistant protective shield means; (c) at least one strip of a said rubber composition being stretched over said conformable composition, said strip covering all exposed electroconductive metal of said splice construction; and (d) a hard shield member substantially enclosing all of said rubber composition, said shield member formed of a moisture-cured resin on a fabric matrix. The first ply of sealing tape is a pressure-sensitive adhesive characteristic which is pressed against and partially into surface imperfections in said pipe. The process of forming the patch includes molding a tacky conformable rubber composition about, and partially into, the perforations by winding said composition under tension into sealing contact with said perforated areas; (b) wrapping a fabric impregnated with a cold-water curable resin over said rubber composition; (c) and curing said resin to a hard, protective composition. position.

The present invention provides a way of making a more permanent repair without more complexity than conventional non-permanent repair methods. The new patch construction provides corrosion protection for the remaining material in the patch area, and it is very inexpensive. Moreover, the kit assembly makes it possible to handle leaks of a variety of sizes and on a large variety of pipe diameters. Repair can be made in any season of the year, and by people who do not have special training.

The materials utilized in the invention are provided in a kit form and include the following:

1. A liquid primer which functions to cover the pipe in the immediate area of a leak and to form a coating which serves to inhibit further corrosion at the site of the original defect in the pipe. Such primers for metal surfaces are well known in the pipe-maintenance art. A preferred type of paint is a rubber-based paint in a solvent vehicle, containing resin modifiers and fillers. Such paints may be diluted to accomodate the mode of Application, i.e. from an aerosol spray-can, by brushing or the like. One such paint is sold under the trade designation Royston 747 Primer by Royston Laboratories Inc. of Pittsburgh, PA. It is preferred to provide a dispensing means for the paint. Thus, aerosol-spray-cans are particularly convenient for use with the kit of the invention.

2. A multiple-ply sealing tape comprising a first ply which is formed of a tough, extensible, material which can be wound, under tension, around the pipe at the leak site. This first ply will provide a principal force-absorbing component of the sealing tape and is suitable formed of a neoprene-based sheet material such as a sheet available from Uniroyal Plastics Co., Inc. under the trade designation 64034 B. It is a 0.020-inch thick sheet of single ply of uncured neoprene rubber. For most uses such ply should be from about 0.01 inch to about 0.25 inches thick. The multi-ply sealing tape also comprises another, inner, thicker ply, suitably about 40 mils thick, which is formed of a permanently tacky, extensible, pressure-sensitive material, and is highly conformable, i.e. putty-like, when placed against the leaky pipe surface and wound tightly against the same with a winding tensioned action being applied by the user to the first ply, this ply is forced firmly into contact with the primed defective surface. This thicker ply will usually be at least 0.01 inch thick, and preferably between 0.02 and 0.06 inches in thickness.

3. Hermetically-sealed in a package, a protective shield means for overwrapping the tape. This shield means contains a pre-mixed curable resin system impregnated into a restraining and reinforcing fabric. A suitable restraining and reinforcing means is an impregnatable and flexible, large mesh fabric such as that known in the art and formed of high-modular yarns, e.g. high strength, high-modular, low-moisture pickup polyethylene-terephthalate yarn of 1000 denier using 6 wales per inch of width and 13 courses per inch length. This fabric material has water absorbency of less than 0.5% by weight after drying and subsequent exposure to 65% relative humidity to room temperature. Such a material as described is currently used in some medical applications. It, and many functional equivalents thereof, are described in U.S. Pat. No. 4,427,002. Also described in that patent are some water-curable resin systems useful in the practice of the present invention, i.e. in coating the bandage of the present invention.

The curable shielding fabric can utilize a flexible large mesh fabric, preferably knit, defining a lattice of relatively large openings. The smallest dimension of the openings will generally be at least 0.015 sq. in. and preferably a minimum of 0.022 sq. in., more usually not exceeding 0.050 sq. in. The openings may be of any configuration, such as square, rectangular, polygonal, or the like. The opening is large enough so that in the finished product the polymer composition preferably does not form air impervious windows across the openings. Strands of the carrier which define the openings are relatively heavy yarn of 400–1500 denier, preferably 500–1000 denier, most preferably 840–1000 denier.

Materials which may be used include polyester, nylon and polypropylene. Preferably polyester is used, most preferably polyethyleneterephthalate fiber (e.g., DACRON. DuPont). These materials are used in the form of a single fiber comprised of a multiplicity of filaments wound to produce the desired denier. Some significant factors concerning the material are that the material provide structural stability to the final product, that it allow for molding to form the patch structure, that it be wettable by the polymer composition, that it be stable under normal usage, and that it have a low water absorbency. A knit of the Raschel type inherently provides a highly flexible carrier material. Such a preferred knit can be comprised of walewise parallel chains and filling threads having sinuous configuration looped between said chains, said fill thread loops being formed around a link of one of said chains and then around a link of another of said chains, each loop of each fill thread being in a course different from the course in which the other loopings thereof occur and the loops of different fill threads in the same course pointing in the same direction, said fabric being substantially unstretchable in the walewise direction, but substantially stretchable in the direction normal thereto, the fabric containing no more than 20 wales per inch width, preferably 5–20 wales per inch width, and not more than 25 courses per inch length, preferably 10–20 courses per inch length, the weight of the fabric being 0.025–0.090 lbs/linear yard in widths of 2–6 inches. Such bandages extensible in at least one direction are particularly valuable in allowing good contact to be made between the polymer-encapsulated splice and the bandage. This is because the spliced area will often be of irregular shape and it is important that the bandage stretch sufficiently to maintain an effective shielding contact over the splice area.

A curable resin wets, and is impregnated into, or onto, the fabric. On subsequent curing, i.e. at the time the patch is made, the resin, with the fabric, must be able to form a hard, tough, but not brittle, protective shield about the splice site. The resin is conveniently a water-cured system.

There are a large number of curable resin systems which can be utilized: Superior systems not only possess hardness and toughness but, once cured, have resistance to hydrolytic attack. The curable system should be easily spreadable and curable within a short time—but not too short—to finish the shield. Moisture-curable systems are advantageous because their time of cure can be readily predicted without primary dependence on the ambient temperature.

Polyurethane systems described in U.S. Pat. No. 4,427,002 are useful. One such system comprises the cured reaction product of a polyurethane prepolymer formed of the reaction of polypropylene ether diol and polypropylene ether triol with either a diisocyanate or a diisocyanate -carbodiimide precursor. Such systems are readily cured by the presence of moisture. Spraying moisture is a suitable field technique and curing will take about 5 to 10 minutes.

The moisture required to effect a cure of the shield system is almost always present in the environment, atmosphere or soil, of the patched pipe. However, it is best practice to spray some water on the fabric and positively assure a cure will be affected within a short time and in arid conditions.

It is desirable that the tape has substantial tensile strength, i.e. in the range of 200 psi or above; preferably above 300 pounds per square inch. The elongation should be substantial; say 100% minimum, but tapes of much greater elongation, say to 700% are readily used. Assuming other minimal properties are met, the principal physical characteristics of the tape will be its toughness. This is conveniently characterized by the "300% Modulus" test known in the art. A 300% modulus of at least about 150 is desirable. It is understood that most of the tape strength characteristics will be contributed by the tough, extensive material, not the compliant tacky layer.

The adhesive layer itself should so adhere to the primed steel surface that it imparts a substantial "peel strength" (180-degree angle of peel) per one inch of peel width of at, preferably, about five pounds or more. Adhesive properties are largely determined by the conforming tacky layer.

A typical tape product used by Applicant has a 325.4 psi tensile strength, 550% elongation, and a 242 psi, 300% modules, and an adhesion to the illustrated primer of about 7.2 lbs as measured by the peel strength. This tape is sized such that the overall tensile strength is 20.5 lbs per inch of tape width. The tape is advantageously about 0.040 to 0.100 inches thick with the conformable tacky layer comprising more than one-half of the overall thickness. A desirable configuration is 0.060-inch tape having a 0.020-inch thickness for the tougher layer and 0.040 inch of the more conformable and adhesive layer.

A useful conformable, adhesive-tape layer is prepared from an ethylene-propylene-rubber (EPR) based and with an isobutylene polymer tackifying additive or from other durable polymers known to the art. The material need not have substantial mechanical strength but it must be free from tendency to brittle fracture even at temperatures contemplated for use. A typical material has a tensile strength of only about 12 psi and an elongation of about 6000%.

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 1:
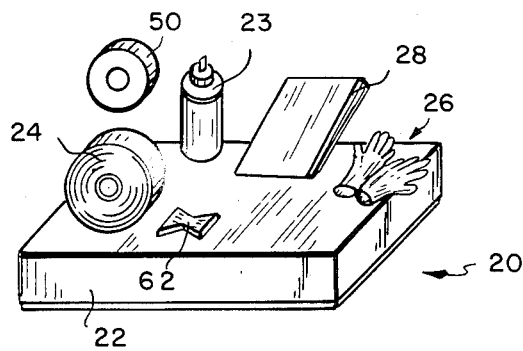
FIG. 1 is an exploded view of a "splice kit" showing the elements included therein.

FIG. 1 illustrates a kit containing elements useful, when in conjunction with one another, to seal low-pressure gas leaks. Thus, kit 20 comprises a container 22 and, within it, a roll of multi-ply extensible sealing tape 24; a pair of gloves 26 to facilitate easy and safe handling of the resinous and sticky materials in the kit; and a sealed bag 28 containing the restraining shield in the form of a fabric impregnated with a moisture-curable polymer system. The kit also contains an aerosol dispensing can of primer paint. The curable resin system on the shield system is a cold-water curable polyurethane prepolymer comprising the reaction product of a polyalkylene-and a diiscyanate.

Figure 2:
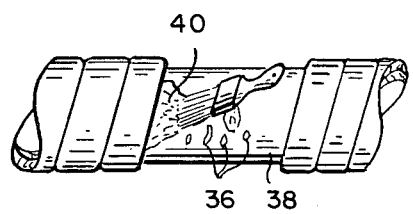
FIGS. 2 through 5 show various steps in the pipe repair procedure.
Figure 3:
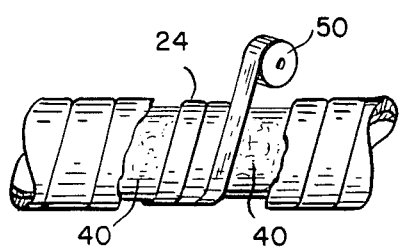
Figure 6:
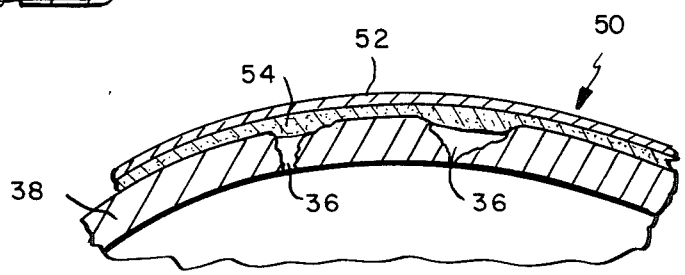
FIG. 6 is a schematic view of how the sealing tape component is urged into the repaired pipe surface.

FIG. 2 illustrates a typical corroded-pipe repair situation wherein perforations 36 appear in the affected area of pipe 38. The area has been cleaned, e.g. as with a wire brush and is primed with a corrosion-resistant paint 40. Then, as seen in FIG. 3 and FIG. 6, a sealing tape 50 comprising a tough extensible outer ply of neoprene 52 and a thicker ply of the easily-conformable, pressure-sensitive adhesive resin 54 is wrapped (conveniently in a 50-percent overlay helical path) to adhere to the pipe and to cover and enter the top-most portion of the perforations 36. The wrapping and stretching action, taken together with the tensile properties of the tape assures that a thicker ply will tightly adhere to the pipe and particularly tend to hug the surfaces at perimeter of the defective areas being patched.

Figure 4:
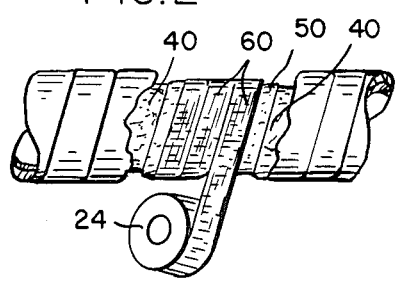
Figure 5:
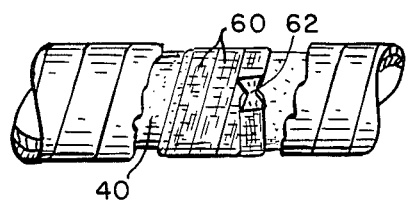

FIG. 4 shows how the reinforcing, or hard-shield-forming fabric 60 is stretched and wound about the sealant, then clipped with clip 62 to prevent its unwinding before it is hardened by the application, or absorption, of moisture.

It is also to be understood that the following claims are intended to cover all of the generic and specific features of the invention herein described and all statements of the scope of the invention which might be said to fall therebetween.

What is claimed is:

1. A kit for use in sealing low-pressure gas pipeline, said kit comprising:
   (a) a sheet of a non-heat recoverable, non heat activated sealing tape comprising (1) a first ply of a conformable, tacky, pressure-sensitive adhesive composition of thickness from at least 0.020 inches, and (2) a second ply of a tough, extensible backing polymer forming means, when wound about said pipe area under tension, to push said conformable adhesive composition into holes of said pipeline being sealed;
   (b) a hermetically-sealed container containing a restraining fabric impregnated with a resin which is curable, by contact with moisture, into a hard, moisture-resistant protective shield means; and
   (c) a package enclosing said sheet and said container.

2. A kit as defined in claim 1 comprising, in addition to said sealant and said sealing sheet, a pair of hand-protecting gloves.

3. A kit as defined in claim 1 wherein said moisture-curable resin is a curable polyurethane resin system.

4. A kit as defined in claim 1 wherein said sealing tape is formed of a neoprene-based second ply and wherein said first ply is formed of a tackified ethylene propylene rubber and wherein said first ply is about twice the thickness of the second ply.

5. A kit as defined in claim 1 wherein said kit comprises a dispensing container of metal primer paint.

6. A sealing patch construction of the type wherein holes in an area of a steel pipe are plugged with a patching material carried on a non-heat recoverable, non-heat activated tape, the improvement wherein said tape is formed of:
   (a) a first, relatively-thick, ply of a conformable, tacky pressure-sensitive composition of thickness from at least 0.020 inches
   (b) a second ply of a tough, extensible backing polymer; and wherein at least one strip of said sealing tape is stretched over said pipe, said strip forming means to cover said holes in said area said second ply forming means to press a portion of said conformable composition into each said hole in said area of said pipe; and
   (c) wherein a hard shield member substantially enclosing all of said tape, said shield member being formed of a moisture-cured resin on a fabric matrix.

7. A sealing patch construction as defined in claim 6 wherein said first ply is of a tackified rubber and is from about 0.02 to about 0.06 inches thick and wherein said second ply is between 0.010 and 0.025 inches thick.

8. A sealing patch construction as defined in claim 7 wherein said first ply has an adhesion to the underlying pipe surface about which it is stretched characterized by a linear peel strength of at least about five pounds per inch of peel width.

9. A sealing patch construction as defined in claim 7 wherein said moisture-cured resin is a polyurethane resin and wherein said second ply is formed of a neoprene-based material.

10. A sealing patch construction as defined in claim 6 wherein said first ply has an adhesion to the underlying pipe surface about which it is stretched characterized by a linear peel strength of at least about five pounds per inch of peel width.

11. A sealing patch construction as defined in claim 6 wherein said moisture-cured resin is a polyurethane resin and wherein said second ply is formed of a neoprene-based material.

12. A process for sealing and then protecting perforated areas of low-pressure gas pipes, said process comprising the steps of:
   (a) molding a tacky conformable non-heat recoverable, non-heat activated rubber composition about the perforations by winding a strip of said composition, of thickness from at least 0.020 inches under tension into sealing contact with said perforated areas using a tough, protective tape ply as a means for said molding and winding action;

(b) wrapping a fabric impregnated with a cold-water curable resin over said rubber composition and protective tape ply; and (c) curing said resin to a hard, protective composition.

* * * * *

UNITED STATES PATENT AND TRADEMARK OFFICE
CERTIFICATE OF CORRECTION

PATENT NO.   : 4,756,337

DATED        : July 12, 1988

INVENTOR(S)  : Robert A. Settineri

It is certified that error appears in the above-identified patent and that said Letters Patent is hereby corrected as shown below:

Column 1, line 24, "2,924,548" should read -- 2,924,546 --.

Column 6, line 32, "sealing" should be deleted.

Column 6, lines 38-39, "enclosing" should read -- encloses --.

Signed and Sealed this

Eighth Day of November, 1988

Attest:

DONALD J. QUIGG

Attesting Officer

Commissioner of Patents and Trademarks